US008560319B1

(12) United States Patent
Huang et al.

(10) Patent No.: US 8,560,319 B1

(45) **Date of Patent: *Oct. 15, 2013**

(54) METHOD AND APPARATUS FOR SEGMENTING A MULTIMEDIA PROGRAM BASED UPON AUDIO EVENTS

(75) Inventors: Qian Huang, Ocean, NJ (US); Zhu Liu, Brooklyn, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1194 days.

This patent is subject to a terminal disclaimer.

(21) Appl. No.: 12/008,912

(22) Filed: Jan. 15, 2008

Related U.S. Application Data

(63) Continuation of application No. 10/862,728, filed on Jun. 7, 2004, now Pat. No. 7,319,964, which is a continuation of application No. 09/455,492, filed on Dec. 6, 1999, now Pat. No. 6,801,895.

(60) Provisional application No. 60/111,273, filed on Dec. 7, 1998.

(51) Int. Cl.
*G10L 15/28* (2013.01)

(52) U.S. Cl.
USPC ........... 704/255; 704/254; 704/270; 704/278; 725/18

(58) Field of Classification Search
USPC ..................... 704/278, 270, 254, 255; 725/18
See application file for complete search history.

(56) References Cited

U.S. PATENT DOCUMENTS

| | | | | |
|---|---|---|---|---|
| 4,783,804 | A | 11/1988 | Juang et al. | |
| 5,402,339 | A | 3/1995 | Nakashima et al. | |
| 5,499,422 | A | 3/1996 | Lavazoli | |
| 5,986,199 | A | 11/1999 | Peevers | |
| 6,009,391 | A * | 12/1999 | Asghar et al. | 704/243 |
| 6,205,422 | B1 | 3/2001 | Gu et al. | |
| 6,295,092 | B1 * | 9/2001 | Hullinger et al. | 348/468 |
| 6,298,323 | B1 | 10/2001 | Kaemmerer | |
| 6,404,925 | B1 | 6/2002 | Foote et al. | |
| 6,418,412 | B1 | 7/2002 | Asghar et al. | |
| 6,801,895 | B1 * | 10/2004 | Huang et al. | 704/270 |
| 7,319,964 | B1 * | 1/2008 | Huang et al. | 704/278 |

OTHER PUBLICATIONS

Saunders, 'real-time discrimination of broadcast speech/music', IEEE international Conference on Acoustics, Speech, and Signal Processing Conference Proceedings, 1996.*
Liu et al., 'audio feature extraction & analysis for scene classification', IEEE, 1997.*
Chien Yong Low, Qi Tian and Hongjiang Zhang, "An Automatic News Video Parsing, Indexing, and Browsing System," Proc. Of the Fourth ACM International Multimedia Conference, Boston, Nov. 1996, pp. 425-426.

(Continued)

*Primary Examiner* — Qi Han

(57) ABSTRACT

The present invention provides for a method and apparatus for segmenting a multi-media program based upon audio events. In an embodiment a method of classifying an audio stream is provided. This method includes receiving an audio stream. Sampling the audio stream at a predetermined rate and then combining a predetermined number of samples into a clip. A plurality of features are then determined for the clip and are analyzed using a linear approximation algorithm. The clip is then characterized based upon the results of the analysis conducted with the linear approximation algorithm.

10 Claims, 4 Drawing Sheets

(56) References Cited

OTHER PUBLICATIONS

A.E. Rosenberg, I. Magrin-Chagnolleau, S. Parthasarathy, and Q. Huang, "Speaker detection in broadcast speech database," Proc of International Conference on Spoken Language Processing, Sydney, Nov. 1998.
A. Farshid, A. Hsu, and M-Y Chiu, "Feature Management for Large Video Databases," Proc. Of SPIE: Storage and Retrieval for Image and Video Databases, San Jose, USA, 1993.
S. Smoliar, H. Zhang, A. Kankanhalli, "Automatic Partitioning of Full-motion Video," IEEE Computer Society Press, 1995.
A. Hauptmann and M. Witbrock, "Story Segmentation and Detection of Commercials in Broadcast News Video," Proc. Of Advances in Digital Libraries Conference, Santa Barbara, Apr. 1998.
M.A. Hearst, "Multi-paragraph Segmentation of Expository Text," The 32.sup.nd Annual Meeting of the Association for Computational Linguistics, pp. 9-16, New Mexico, USA, Jun. 1994.
Z. Liu and Q. Huang, "Classification of Audio Events in Broadcast News," Proc. Of IEEE Workshop in Multimedia Signal Processing, Dec. 1998.
I. Mani, D. House, D. Maybury, and M. Green, "Towards Content-based Browsing of Broadcast News Video," Intelligent Multimedia Information Retrieval, 1997.
M. Maybury, M. Merlino, and J. Rayson, "Segmentation, Content Extraction and Visualization of Broadcast News Video using Multistream Analysis," Proc. Of ACM Multimedia, Boston, USA, 1996.
A. Merlino, D. Morey, and M. Maybury, "Broadcast News Navigation Using Story Sgmentation," Proc. Of ACM Multimedia, Nov. 1997.
M.G. Brown, J. Foote, and J. Jones, "Automatic content-based retrieval of broadcast news," Proc. Of ACM Multimedia, pp. 35-42, San Francisco, USA, 1995.
J. Nam and A.H. Tewfik, "Combined Audio and Visual Streams Analysis for Video Sequence Segmentation," Proc. Of ICASSP, vol. 4, pp. 2665-2668, 1997.
Y. Rui, T.S. Huang, and S. Mehrotra, "Constructing Table-of-Content for Videos," ACM Journal of Multimedia Systems, 1998.
M. Yeung and B.-L. Yeo, "Time-constrained Clustering for Segmentation of video into Story Units," Proc. Of International Conference on Pattern Recognition, pp. 375-380, Vienna, Austria, Aug. 1996.
M. Yeung, B-.L.Yeo, and B. Liu, "Extracting Story Units from Long Programs for Video Browsing and Navigation," Proc. Of International Conference on Multimedia Computing and Systems, Jun. 1996.
Y.L. Chang, W. Zeng, I. Kamel, and R. Alonso, "Integrated Image and Speech Analysis for Content-based video Indexing," Proc. Of Multimedia, pp. 306-313, Sep. 1996.

* cited by examiner

METHOD AND APPARATUS FOR SEGMENTING A MULTIMEDIA PROGRAM BASED UPON AUDIO EVENTS

CROSS-REFERENCE TO RELATED APPLICATIONS

This application is a continuation of application Ser. No. 10/862,728, entitled "Method and Apparatus for Segmenting a Multi-Media Program Based upon Audio Events," filed on Jun. 7, 2004, now U.S. Pat. No. 7,319,964, issued Jan. 15, 2008, which is a continuation of application Ser. No. 09/455,492, entitled "Method and Apparatus for Segmenting a Multi-Media Program Based upon Audio Events," filed on Dec. 6, 1999, now U.S. Pat. No. 6,801,895, issued Oct. 5, 2004, which claims the benefit of U.S. Provisional Patent Application Ser. No. 60/111,273 filed Dec. 7, 1998, and entitled "Classification Of Audio Events.".

FIELD OF THE INVENTION

The present invention is directed to audio classification. More particularly the present invention is directed to a method and apparatus for classifying and separating different types of multi-media events based upon an audio signal.

BACKGROUND

Multi-media presentations simultaneously convey both audible and visual information to their viewers. This simultaneous presentation of information in different media has proven to be an efficient, effective, and well received communication method. Multi-media presentations date back to the first "talking pictures" of a century ago and have grown, developed, and improved not only into the movies of today but also into other common and prevalent communication methods including television and personal computers.

Multi-media presentations can vary in length from a few seconds or less to several hours or more. Their content can vary from a single uncut video recording of a tranquil lake scene to a well edited and fast paced television news broadcast containing a multitude of scenes, settings, and backdrops.

When a multi-media presentation is long, and only a small portion of the presentation is of interest to a viewer, the viewer can, unfortunately, spend an inordinate amount of time searching for and finding the portion of the presentation that is of interest to them. The indexing or segmentation of a multi-media presentation can, consequently, be a valuable tool for the efficient and economical retrieval of specific segments of a multi-media presentation.

In a news broadcast on commercial television, stories and features are interrupted by commercials interspersed throughout the program. A viewer interested in viewing only the news programs would, therefore, also be required to view the commercials located within the individual news segments. Viewing these interposed and unwanted commercials prolongs the entire process for the viewer by increasing the time required to search through the news program in order to find the desired news pieces. Conversely, some viewers may instead be interested in viewing and indexing the commercials rather than the news programs. These viewers would similarly be forced to wade through the lengthy news programs in order to find the commercials that they sought to review. Thus, in both of these examples, it would benefit the user if the commercials and the news segments could be easily separated, identified, and indexed, so that the segments of the news program that were of specific interest to a viewer could be easily identified and located.

Various attempts have been made to identify and index the commercials placed within a news program. In one known labor intensive process the news program is indexed through the manual observation and indexing of the entire program—an inefficient and expensive endeavor. In another known process researchers have utilized the introduction or re-introduction of an anchor person in the news program to provide a queue for each segment of the broadcast. In other words, every time the anchor person was introduced a different news segment was thought to begin. This method has proven to be a complex and inaccurate process relying upon the individual intricacies of the various news stations and their various news anchor people; one that can not be implemented on a widespread basis but is, rather, confined to a restrictive number of channels and anchor people due to the time required in establishing the system.

It is, therefore, desirable to provide a simpler process for identifying and indexing commercials in a television news program: one that does not rely on the individual queues of a particular news network or reporter; one that can be efficiently and accurately implemented over a wide range of news programs and commercials; one that overcomes the shortcomings of the processes used today.

SUMMARY OF THE INVENTION

The present invention includes a method and apparatus for segmenting a multi-media program based upon audio events. In one embodiment a method of classifying an audio stream is provided. This method includes receiving an audio stream. Sampling the audio stream at a predetermined rate and then combining a predetermined number of samples into a clip. A plurality of features are then determined for the clip and are analyzed using a linear approximation algorithm. The clip is then characterized based upon the results of the analysis conducted with the linear approximation algorithm.

In an alternative embodiment of the present invention a computer-readable medium is provided. This medium has stored thereon instructions that are adapted to be executed by a processor and, when executed, define a series of steps to identify commercial segments of a television news program. These steps include selecting samples of an audio stream at a selected interval and then grouping these samples into clips which are then analyzed to determine if a commercial is present within the clip. This analysis includes determining: the non silence ratio of the clip; the standard deviation of the zero crossing rate of the clip; the volume standard deviation of the clip; the volume dynamic range of the clip; the volume undulation of the clip; the 4 Hz modulation energy of the clip; the smooth pitch ratio of the clip; the non-pitch ratio of the clip; and, the energy ratio in the sub-band of the clip.

DETAILED DESCRIPTION

The present invention provides for the segmentation of a multi-media presentation based upon its audio signal component. In one embodiment a news program, one that is commonly broadcast over the commercial airwaves, is segmented or categorized into either individual news stories or commercials. Once categorized the individual news segments and commercial segments may then be indexed for subsequent electronic transcription, cataloguing, or study.

Figure 1:
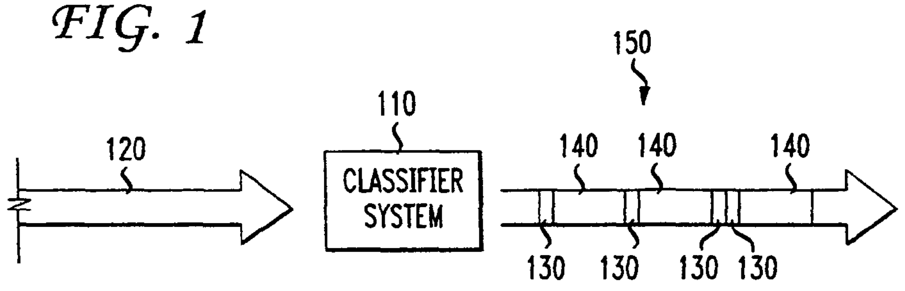
FIG. 1 is a flow diagram of one embodiment of the present invention wherein a news program is categorized by a classifier system into news clips and commercial clips.

FIG. 1 illustrates an overview of a classifier system in accordance with one embodiment of the present invention. In FIG. 1 the signal 120 from a news program containing both an audio portion and a video portion is fed into the classifier system 110. This signal 120 may be a real-time signal from the broadcast of the news program or alternatively may be the signal from a previously broadcast program that has been recorded and is now being played back. Upon its receipt of the news program signal 120, the classifier system 110 may partition the signal into clips, read the audio portion of each clip, perform a mathematical analysis of the audio portion of each clip, and then, based upon the results of the mathematical analysis, classify each clip as either a news portion 140 or a commercial portion 130. This classified segmented signal 150, containing news portions 140 and commercial portions 130, then exits the classifier system 110 after the classification has been performed. Once identified, these individual segments, which contain both audio and video information, may be subsequently indexed, stored, and retrieved.

Figure 2:
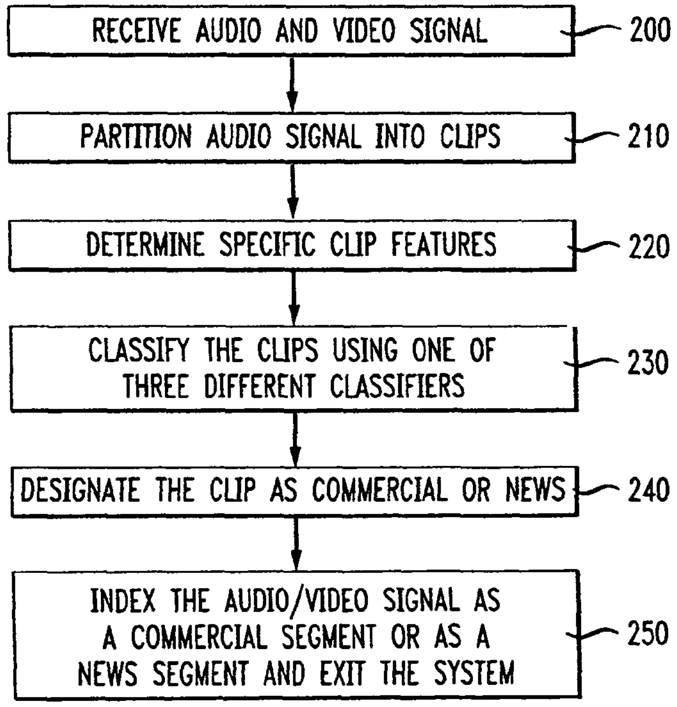
FIG. 2 is a flow diagram describing the steps taken within the classifier system of FIG. 1 in accordance with an embodiment of the present invention.

FIG. 2 illustrates the steps that may be taken by the classifier system of FIG. 1. In FIG. 2, at step 200, the classifier system receives the combined audio and video signal of a news broadcast. Then, at step 210, the classifier system samples the audio signal of the news broadcast to create individual audio clips for further analysis. These audio clips are then analyzed with several specific features of each of the clips being determined by the classifier system at step 220. Next, at step 230, the classifier system analyzes the audio attributes of each one of the clips with a classifier algorithm to determine if each one of the clips should be classified as a commercial segment or as a news segment. At step 240 the classifier system then designates the program segment associated with the audio clip as a commercial clip or as a news clip based upon the results of the analysis completed at step 230. At step 250 the news broadcast signal having a video portion and an audio portion exits the classifier system with its news segments and commercial segments identified.

Figure 3:
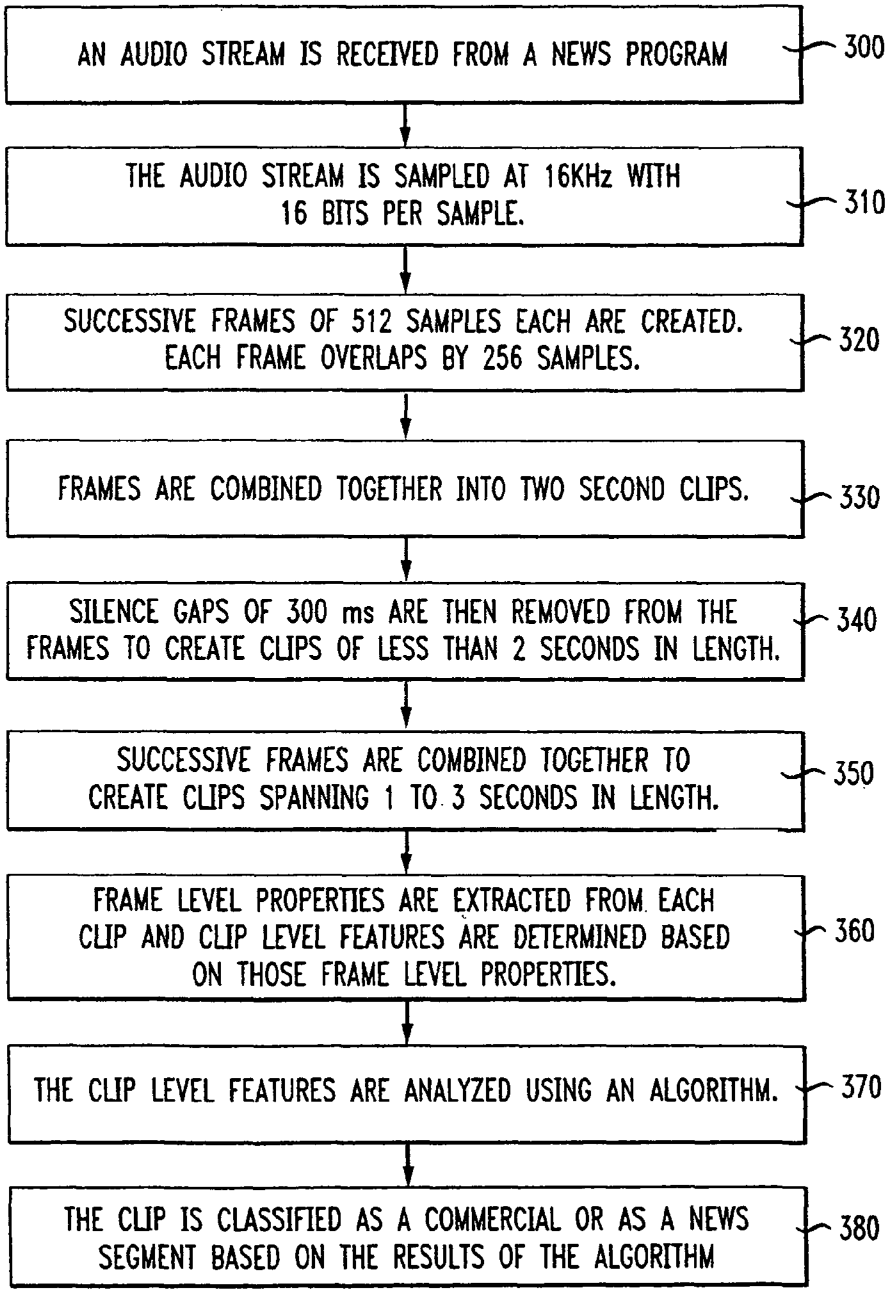
FIG. 3 is a flow diagram of a system used to categorize a clip as a news clip or a commercial clip in accordance with an alternative embodiment of the present invention.

FIG. 3 is a flow chart of the steps taken by a classifier system in accordance with an alternative embodiment of the present invention. At step 300, and similar to step 200 in FIG. 2, the audio stream of a news program is received by the classification system. Upon its receipt, at step 310, the classifier system samples the audio stream at 16 KHz with 16 bits of information being gathered in each sample. Then, at step 320, the samples are combined into overlapping frames. These frames are composed of 512 samples each, with the first 256 samples being shared with the previous frame and the last 256 samples being shared with the next subsequent frame. In other words, each adjacent 512 sample frame consists of the last 256 samples from its most previous adjacent frame and the first 256 sample from its next subsequent adjacent frame. This sampling methodology is used to smooth over the transitions between adjacent audio frames.

Next, at step 330, adjacent frames are combined together to form two second long clips. Then, at step 340, non-audible silence gaps of 300 ms or more are removed from these two second long clips, creating clips of varying individual lengths having durations of less than two seconds each. If, as a result of the removal of these silence gaps, a clip was shortened to one of less than one second in length, it will be combined with an adjacent clip, at step 350, to create a clip that will last more than one second and no longer than three seconds. The clips are combined in this fashion to create longer clips, which provide better sample points, for the mathematical analysis that is performed on the clips.

Next, at step 360, the audio properties of the clips are sampled in order to compute nine or fourteen audio features for each of the clips. These audio features are computed by first measuring eight audio properties of each and every frame within the clip and then, subsequently, computing various clip level features that are based upon the audio properties computed for each of the frames within the clip. These clip level features are then analyzed to determine if the clip is a news clip or a commercial clip.

The eight frame level audio properties measured for each frame within a clip are: 1) volume, which is the root mean square of the amplitude measured in decibels; 2) zero crossing rate of the audio signal, which is the number of times that an audio waveform crosses the zero axis; 3) pitch period of the audio signal using an average magnitude difference function; 4-6) the energy ratios of the audio signal in the 0-630 Hz, 630-1720 Hz, and 1720-4400 Hz sub-bands of the audio signal; 7) frequency centroid, which is the centroid of frequency ranges within the frame; and 8) frequency bandwidth, which is the differences between the highest and lowest frequencies in the clip. Each of the three sub-bands corresponds to a critical band in the cochlear filters of the human auditory model.

As noted, once these frame-level properties are measured for each of the frames within a clip these frame level properties are used to calculate the clip level features of that particular clip. The fourteen clip level features calculated from these frame level properties are as follows: 1) Non-Silence Ratio (NSR) which is the ratio of silent frames over the number of frames in the entire clip; 2) Standard Deviation of Zero Crossing Rate (ZSTD) which is the standard deviation for the zero crossing rate across all of the frames in the clip; 3) Volume Standard Deviation (VSTD) which is the standard deviation for the volume levels across all of the frames in the clip; 4) Volume Dynamic Range (VDR) which is the absolute difference between the minimum volume and the maximum volume of all of the frames in the clip normalized by the maximum volume in the clip; 5) Volume Undulation (VU) which is the accumulated summation of the difference of adjacent peaks and valleys of the volume contour; 6) 4 Hz Modulation Energy (4ME) which is the frequency component around 4 Hz of the volume contour; 7) Smooth Pitch Ratio (SPR) which is the ratio of frames that have a pitch period varying less than 0.68 ms from the previous frames in the clip; 8) Non-Pitch Ratio (NPR) which is the ratio of the frames wherein no pitch is detected as compared to the entire clip; 9-11) Energy Ratio in Sub-band (ERSB) which is the energy weighted mean of the energy ratio sub-band for each frame in the range of 0-4400 Hz—it can also be calculated for three sub-bands in which the sub-bands are the 0-630 Hz range, the 630-1720 Hz range, and the 1720-4400 Hz range; 12) Pitch Standard Deviation (PSD) which is the standard deviation of the pitch for all of the frames within the clip; 13) Frequency Centroid (FC) which is the centroid of the frequency ranges for each of the frames within the clip; and, 14) Bandwidth (BW) which is the differences between the highest and lowest frequencies in the clip.

Continuing to refer to FIG. 3, at step 370, these clip level features are analyzed using one of three algorithms. Two of these algorithms, the Simple Hard Threshold Classifier (SHTC) algorithm and the Fuzzy Threshold Classifier (FTC) algorithm are linear approximation algorithms, meaning that they do not contain exponential variables, while the third, a Gaussian Mixture Model (GMM), is not a linear approximation algorithm. The two linear approximation algorithms (SHTC and FTC) utilize the first nine clip level features (NSR, VSTD, ZSTD, VDR, VU, 4ME, SPR, NPR, & ERSB [0-4400 Hz]) in their analysis while the Gaussian Mixture Model (GMM) uses all fourteen clip level features in its analysis. Then, utilizing at least one of these algorithms, the clip is classified at step 380 as either a commercial clip or a news clip based upon the results of the analysis from one of these algorithms.

The simple hard threshold classifier discussed above is a linear approximation algorithm that functions by setting threshold values for each of the nine clip level features and, then, comparing these values with the same nine clip level features of a clip that is to be classified. When each of the nine clip level features of a clip being classified individually satisfies every one of the nine threshold values, the clip is categorized as a commercial. Conversely, if one or more of the nine threshold values do not meet or exceed the individual threshold value set in the simple hard threshold classifier, the entire clip is classified as a news segment. For two of the features, (NSR and NUR) the threshold is satisfied by an unclassified clip feature value that is larger than the threshold value and for the other seven features (VSTD, ZSTD, VDR, VU, 4ME, SMR, ERSB) the threshold will be considered satisfied by an unclassified clip feature value that is smaller than the threshold value.

Figure 4:
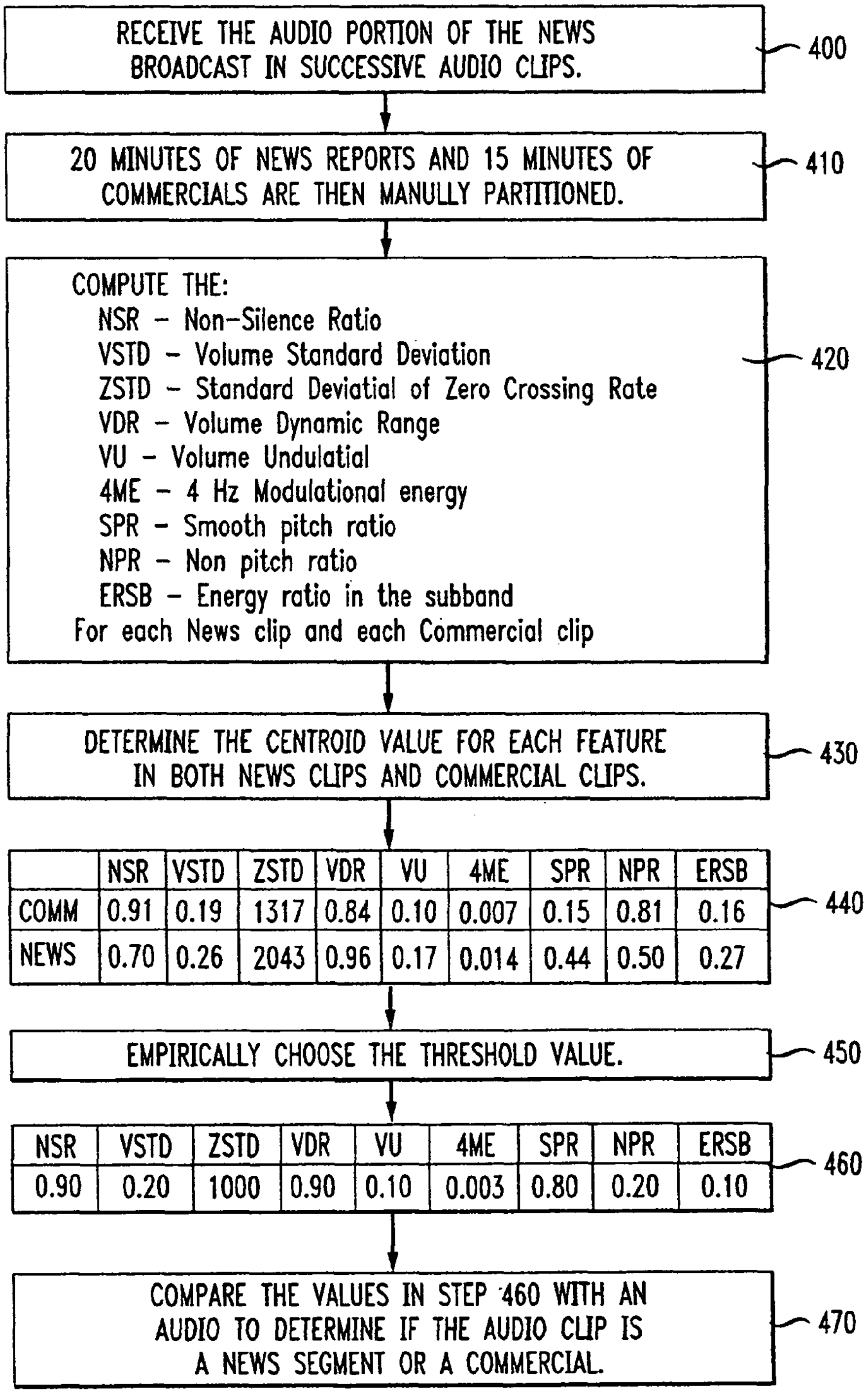
FIG. 4 is a flow diagram of a simple hard threshold classifier used in accordance with a second alternative embodiment of the present invention.

FIG. 4 is a flow chart of the steps taken by a simple hard threshold classifier algorithm in accordance with a second alternative embodiment of the present invention. In this embodiment the simple hard threshold algorithm is first calibrated and then utilized to classify a clip as a news clip or as a commercial clip. At step 400, an audio portion of a news program, previously sampled and broken down into clips, is provided. Then, at step 410, as part of the required calibration of the simple hard threshold classifier algorithm, twenty minutes of news segments and fifteen minutes of commercial segments are manually partitioned and identified. Next, at step 420, clip features one through nine (NSR, VSTD, ZSTD, VDR, VU, 4ME, SPR, NPR, & ERSB [0-4400 Hz]) are calculated for each of the manually separated clips. These clip level features are calculated using the process described above wherein the frame level properties are first determined and then the clip level features are calculated from these frame level properties. Then, at step 430, the centroid value for each clip level feature, of both the news clips and the commercial clips, is calculated. This calculation results in eighteen clip level feature values being generated, nine for the news clips and nine for the commercial clips. An example of the resultant values is presented in a table shown at step 440. Then, at step 450, a threshold number is chosen for each individual clip level feature through the empirical evaluation of the two centroid values established for each feature.

This empirical evaluation yields the nine threshold values used in the simple hard threshold classifier. An example of the threshold values chosen at step 450 from the eighteen centroid values illustrated at step 440 is illustrated at step 460. These threshold values, determined for a particular sampling protocol (16 kHz sample rate, 512 samples per frame in this example), are compared with the nine clip level feature values of subsequently input unclassified clips to determine if the unclassified clip is a news clip or a commercial clip. In other words, once the hard threshold values are set for a particular sampling protocol all future clips are compared to these clip level values to determine if the clip is a news clip or a commercial clip. If all nine features of the clip satisfy each of the previously set thresholds, the clip is classified as a commercial clip. Alternatively, if only one of the clip level features does not meet or exceed its specific threshold values the clip will be classified as a news clip. As noted above, for two of the features, (NSR and NUR) the threshold is satisfied by an unclassified clip feature value that is larger than the threshold value and for the other seven features (VSTD, ZSTD, VDR, VU, 4ME, SMR, ERSB) the threshold will be considered satisfied by an unclassified clip feature value that is smaller than the threshold value.

In an alternative embodiment a smoothing step is utilized to provide improved results for the Simple Hard Threshold Algorithm as well as the Fuzzy Classifier Algorithm and the Gaussian Mixture Model discussed below. This smoothing is accomplished by considering the clips adjacent to the clip that is being compared to the threshold values. Rather than solely considering the clip level values of a single clip against the threshold values, the clips on both sides of the clip being classified are also considered. In this alternative embodiment, if the clips on both sides of the clip being classified are either both news or both commercials, the clip between them, the clip being evaluated, is also classified as either a news clip or as a commercial clip. By considering the values of adjacent clips, in conjunction with the clip being classified, improper aberrations in the audio stream are smoothed over and the accuracy of the hard threshold classifier algorithm is improved.

In another alternative embodiment of the present invention a fuzzy threshold classifier algorithm, instead of a simple hard threshold classifier, is used to classify the individual clips of a news program. This algorithm, like the hard threshold classifier algorithm discussed above, utilizes the first nine clip level features (NSR, VSTD, ZSTD, VDR, VU, 4ME, SPR, NPR, & ERSB [0-4400 Hz]) to classify the clip as either a news clip or a commercial clip. The fuzzy threshold classifier differs from the simple hard threshold classifier in the methodology used to establish the thresholds and also in the methodology used to compare the nine clip level feature thresholds to an unclassified clip.

The fuzzy threshold classifier employs a threshold range of acceptable clip level feature values rather than a threshold cutoff as employed in the simple hard threshold classifier. The fuzzy threshold classifier also considers the overall alignment between the clip level features of the clip being classified and the individual clip level thresholds. In the fuzzy threshold classifier algorithm when each and every clip level feature does not meet the predetermined threshold values for the commercial class the clip may nevertheless be classified as a commercial clip because the fuzzy threshold classifier system does not use hard threshold cutoffs. Comparatively, and as noted above, if only one clip level feature value is not satisfied under the simple hard threshold set for the commercials in the classifier algorithm the clip will not be classified as a commercial.

The fuzzy threshold classifier functions by assigning a weight or correlation value between each clip level feature of the clip being classified and the threshold value established for that clip level feature in the fuzzy threshold classifier algorithm. Even though the threshold value is not met, the fuzzy threshold classifier will, nevertheless, assign some weight factor (wf) for the degree of correlation between the clip level feature of the clip being analyzed and the clip level feature established in the fuzzy threshold classifier. Then, once individual weights are assigned for each clip level feature value of the unclassified clip, these weights are added together to create a clip membership value (CMV). Therefore, the sum of the weight factors for each of the nine clip level features is designated as a Clip Membership Value (CMV). This CMV is then compared to an overall Threshold Membership Value (TMV). If the TMV is exceeded the clip is classified as a news clip; if it is not, the clip is classified as a commercial clip.

Like the simple hard threshold classifier above the fuzzy threshold classifier may first be calibrated or optimized to establish values for each of the nine clip level features for comparison with clips that are being classified and to designate the Threshold Membership Value (TMV) used in the comparison. As noted, the first step is to set the individual clip level threshold values to the clip level threshold values set in the simple hard threshold algorithm. Next, an initial overall Threshold Membership Value (TMV) is determined. This value may be determined testing TMV values between 2 and 8 in 0.5 increments and choosing the TMV value that most accurately classifies unclassified clips utilizing the weight factors calculated from the nine clip level threshold values. (The methodology of calculating weight factors utilizing the nine clip level threshold values is discussed in detail below.) Thus an initial TMV is established for the initial clip level threshold feature values. Next all nine of the clip level threshold feature values are simultaneously and randomly modified. They are each modified by randomly generating an increment value for each clip level threshold feature, multiplying this increment value by a learning rate or percentage, which may be set to 0.05, to control the variance of the increment value, and then adding this new increment value, to their associated individual clip level threshold feature value to create new clip level threshold feature values. This step can be illustrated mathematically by the formula $$CLTV_0' = CLTV_0 + \propto \Delta CLTV_0$$

where: $CLTV_0$, is an array containing the initial nine clip level threshold values;

$CLTV_0'$ is an array containing the new nine clip level threshold values;

$\Delta CLTV_0$ is an array of the randomly generated incremental values for each of the nine clip level threshold values; and $\propto$ is the learning rate which has been set at 0.05.

Now, having generated the new clip level feature threshold values for each of the nine clip level features a new Threshold Membership Value (TMV) is calculated. The new TMV is calculated in the same manner as described above but this time utilizing the new nine clip level feature threshold values. Again, starting with 2 and testing every value up to and including 8 in 0.5 increments, the most accurate TMV is chosen. For each increment the screening accuracy of the new Threshold Membership Value and the new nine clip level feature threshold values are compared with the screening accuracy of the previous values. If the new values are more accurate they are adopted in the next training or calibration cycle, if the new values are less accurate the old values are re-adopted and the next training cycle is begun with the previous values. This iterative cycle can continue for a predetermined number of cycles, for example two thousand. When the predetermined number of iterations have been completed the training cycle will complete one last iterative cycle and the last TMV value and clip level feature threshold values will be calculated. In this iterative cycle rather than using a step increment of 0.5 to find the optimum value for TMV a step increment of 0.1 is chosen to calculate the value. This smaller increment is chosen in order to provide a more accurate value for TMV.

Once the final value for TMV and the individual clip level threshold features values as chosen they will be utilized to screen future unclassified clips. In this screening process, and as noted above, weight factors or alignment values are created for each clip feature being classified. If a clip feature value directly corresponds with a clip level threshold value that particular clip feature will be assigned a zero point five weight factor (wf) for that particular clip level feature. If the clip level feature value differs by more than ten percent with the clip level threshold value the weight factor (wf) assigned that particular clip level feature will be either a zero or a one dependant upon which clip level feature is being considered. As described above the weight factors (wf) are cumulatively totaled to create the clip membership value (CMV). This CMV will range from zero to nine as each of the nine weight factors can individually range from zero to one.

Figure 5:
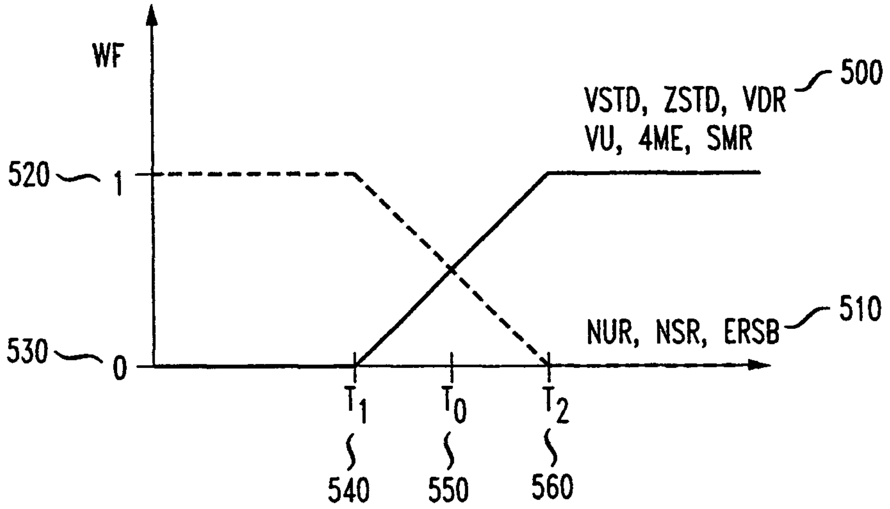
FIG. 5 illustrates a fuzzy logic membership function as applied in a third alternative embodiment of the present invention.

FIG. 5 illustrates the fuzzy membership function that designates the weight factors described above. As is evident, the membership function varies linearly from zero to one for six of the clip level features (VSTD, ZSTD, VDR, VU, 4ME, SMR) and linearly from one to zero for the other three clip level features (NUR, NSR, ERSB). In FIG. 5, "$T_0$"550 is the newly calibrated threshold value for the particular feature being evaluated and "$T_1$"540 denotes a value ten percent less than "$T_0$"550, and "$T_2$"560 denotes a value ten percent more than the value "$T_0$". As can be seen, a clip level feature value of ninety percent or less for six of the clip level threshold values (VSTD, ZSTD, VDR, VU, 4ME, SMR) is assigned a zero and, conversely a clip level feature value of ninety percent or less for the other three clip level features (NUR, NSR, ERSB) is assigned a one. As can also be seen when the clip level feature is ten percent or more than six of the clip level features (VSTD, ZSTD, VDR, VU, 4ME, SMR) the clip level feature score will be a one and conversely, when the clip level feature is ten percent or more for the other three clip level features (NUR, NSR, ERSB) a zero is assigned. In between these values, when the clip feature value is within the ten percent range of the clip level threshold value, the clip level membership value or score will range linearly from zero to one. For example, when the clip level feature is 95% of the threshold value "$T_0$" the weight factor or score assigned for that value will be either a 0.25 or 0.75 dependant on which clip level feature was being evaluated. Specifically, if the VU was 95% of "$T_0$" a 0.25 value would be assigned for that particular clip. Similarly, if the NUR were 95% of "$T_0$" a 0.75 weight factor would be assigned for that particular clip. As is evident, the weight factor assigned for the particular clip level feature varies linearly between zero and one for values that are between ninety and one hundred and ten percent of the particular clip level threshold "$T_0$." As described above, once each one of the weight factors or scores are calculated they are added together to compute a cumulative clip membership value CMV. If this cumulative clip membership value CMV exceeds the predetermined threshold membership value (TMV) the clip will be classified as a news clip. If the cumulative clip membership value CMV is equal to or less than the predetermined threshold membership value (TMV) the clip will be classified as a commercial.

Providing an empirical example, starting with a 20 minute segment of news and a 15 minute segment of commercials sampled at a rate of 16 KHz with 16 bits of data in each sample and 512 samples in each frame, the following fuzzy classifier thresholds were established utilizing the provided hard threshold starting points and the above described methodology.

| Feature | NSR | VSTD | ZSTD | VDR | VU | 4ME | SMR | NUR | ERSB2 |
|---|---|---|---|---|---|---|---|---|---|
| Hard-T | 0.9 | 0.20 | 1000 | 0.90 | 0.10 | 0.003 | 0.80 | 0.20 | 0.10 |
| Fuzzy | 0.8 | 0.25 | 1928 | 1.02 | 0.17 | 0.02 | 0.41 | 0.64 | 0.31 |

These fuzzy threshold values also result in a threshold membership value TMV of 2.8 in this particular example. Therefore, when utilizing the fuzzy threshold classifier for this sampling protocol (16 KHz, 512 samples/frame), whenever the clip membership values CMV exceeds 2.8, for a clip being classified, the clip is classified as a news clip.

In a fourth alternative embodiment a Gaussian Mixture Model is used to classify the audio clips in place of the linear approximation algorithms described above. Unlike these linear algorithms the Gaussian Mixture Model utilizes all fourteen clip level features of an audio clip to determine if the audio clip is a news clip or a commercial clip. This Gaussian Mixture Model, which has proven to be the most accurate classification system, consists of a set of weighted Gaussians' defined by the function:

$$f(x) = \sum_{i=1}^{k} \varpi_i g[m_i, V_i](x) \text{ where}$$

$$g_i[M_i, V_i](x) = \frac{1}{\left(\sqrt{2\pi})^n \sqrt{\det(V_i)}\right.} \times e^{\frac{(xM_i)^T V_i^{-1}(x - M_i)}{2}}$$

In this function, $\overline{\omega}$ is the weight factor assigned to the ith Gaussian distribution, $g_i$ is the ith Gaussian distribution with mean vector mi and covariance matrix $V_i$, k is the number of Gaussians being mixed, and x is the dependent variable. The mean vector $m_i$ is a 14×1 array or vector that contains the fourteen individual clip level features for the clip being classified. The covariance matrix Vi is a higher dimensional form of a standard deviation variable that is a 14×14 matrix. In practice, two Gaussian Mixture models are constructed, one models the class of news and the other models the class of commercials in the feature space. Then a clip to be classified is compared to both GMM models and is subsequently classified based upon what GMM the clip more closely resembles. Two Gaussian Mixture Models are calibrated or trained with manually sorted clip level feature data. Through an iterative training process, the Gaussian Mixture Model's parameters (the mean mi and the covariance matrix $V_i$, $1 \le i \le k$) as well as the weight factor $w_i$, $1 \le i \le k$, of the Gaussians are adjusted and optimized so that the resultant Gaussian Mixture Model most closely fit the manually sorted clip level feature data. In other words, both Gaussian Mixture Models are trained such that the variance between the models and the manually sorted clip level feature data for their particular category—news or commercials—is minimized.

The two Gaussian Mixture Models are trained by first computing a feature vector for each training clip. These feature vectors are 14×1 arrays that contain the clip level feature values for each of the fourteen clip level features in each of the manually sorted clips being used as training data. Next, after computing these vectors, vector quantization (clustering) is performed on all of the feature vectors for each model to estimate the mean vector m and the covariance matrices V of k clusters, where each resultant cluster k is the initial estimate of a single Gaussian. Then an Expectation and Maximization (EM) algorithm is used to optimize the resultant Gaussian Mixture Model. The EM is an iteration algorithm that examines the current parameters to determine if a more appropriate set of parameters will increase the likelihood of matching the training data.

Once optimized the adjusted GMM's are used to classify unclassified clips. In order to classify a clip the clip level feature values for that clip are entered into the model as x and a resultant computed value f(x) is provided. The resultant value is a likelihood that the clip belongs to that particular Gaussian Mixture Model. The clip is then classified based upon which model gives a higher likelihood value.

These above described embodiments overcome the time consuming and labor intensive process of bifurcating commercial clips and news clips from news programs known in the past. They are also illustrative of the various ways in which the present invention may be practiced. Other embodiments can be implemented by those skilled in the art without departing from the spirit and scope of the present invention.

What is claimed is:

1. A method of classifying a segment of a multimedia program as one of a news segment and a commercial segment, comprising:

(a) receiving an audio portion of the multimedia segment;

(b) sampling the audio portion at a predetermined rate;

(c) combining a predetermined number of samples into a clip;

(d) determining a plurality of signal property features of the clip, the signal property features including a smooth pitch ratio;

(e) analyzing the plurality of signal property features of the clip using a linear approximation algorithm, the linear approximation algorithm being a hard threshold classifier algorithm wherein it is determined whether each of the plurality of signal property features of the clip satisfies a respective threshold value; and (f) characterizing the clip as the commercial segment if all of the plurality of signal property features of the clip satisfy the respective threshold value, and characterizing the multimedia program segment as the news segment if at least one of the plurality of signal property features of the clip does not satisfy the respective threshold value.

2. The method of claim 1 wherein the multimedia program is a television news program.

3. The method of claim 1 wherein the clip is comprised of a plurality of frames.

4. The method of claim 3, wherein each frame of the plurality of frames overlaps at least one adjacent frame.

5. A process for separating commercials from television news programs comprising:

(a) receiving a television news broadcast containing an audio signal;

(b) extracting said the audio signal from the television news broadcast;

(c) sampling the audio signal at a continuous predetermined rate;

(d) grouping the audio samples together into an individual clip;

(e) analyzing of at least nine features of a first individual clip using a linear approximation algorithm, the features including a smooth pitch ratio, the linear approximation algorithm being a hard threshold classifier algorithm wherein it is determined whether each of the at least nine signal property features of the first individual clip satisfies a respective one of the at least nine threshold values; and (f) characterizing the first individual clip as a commercial if all of the at least nine signal property features of the clip satisfy the respective threshold value, and characterizing the first individual clip as a news segment if at least one of the at least nine signal property features of the clip does not satisfy the respective threshold value.

6. The process of claim 5 wherein the hard threshold classifier has a smoothing algorithm.

7. The process of claim 5 wherein (f) further comprises:

(i) characterizing a second individual clip as a commercial;

(ii) if the first individual clip is characterized as a commercial, then characterizing a third individual clip between the first and second clips as a commercial.

8. The process of claim 5 wherein the continuous predetermined sampling rate is 16 kHz.

9. The method of claim 5 wherein grouping the audio samples together into an individual clip further includes first combining the samples into overlapping frames.

10. A method of classifying a segment of a multimedia program, comprising:

(a) receiving an audio portion of the multimedia segment;

(b) sampling the audio portion at a predetermined rate;

(c) combining a predetermined number of samples into a clip;

(d) determining a plurality of signal property features of the clip, the signal property features including a non-pitch ratio;

(e) analyzing the plurality of signal property features of the clip using a linear approximation algorithm, the linear approximation algorithm being a hard threshold classifier algorithm wherein it is determined whether each of the plurality of signal property features of the clip satisfies a respective threshold value; and (f) characterizing the clip as a commercial segment if all of the plurality of signal property features of the clip satisfy the respective threshold value, and characterizing the multimedia program segment as a news segment if at least one of the plurality of signal property features of the clip does not satisfy the respective threshold value.

* * * * *